Figure 10:
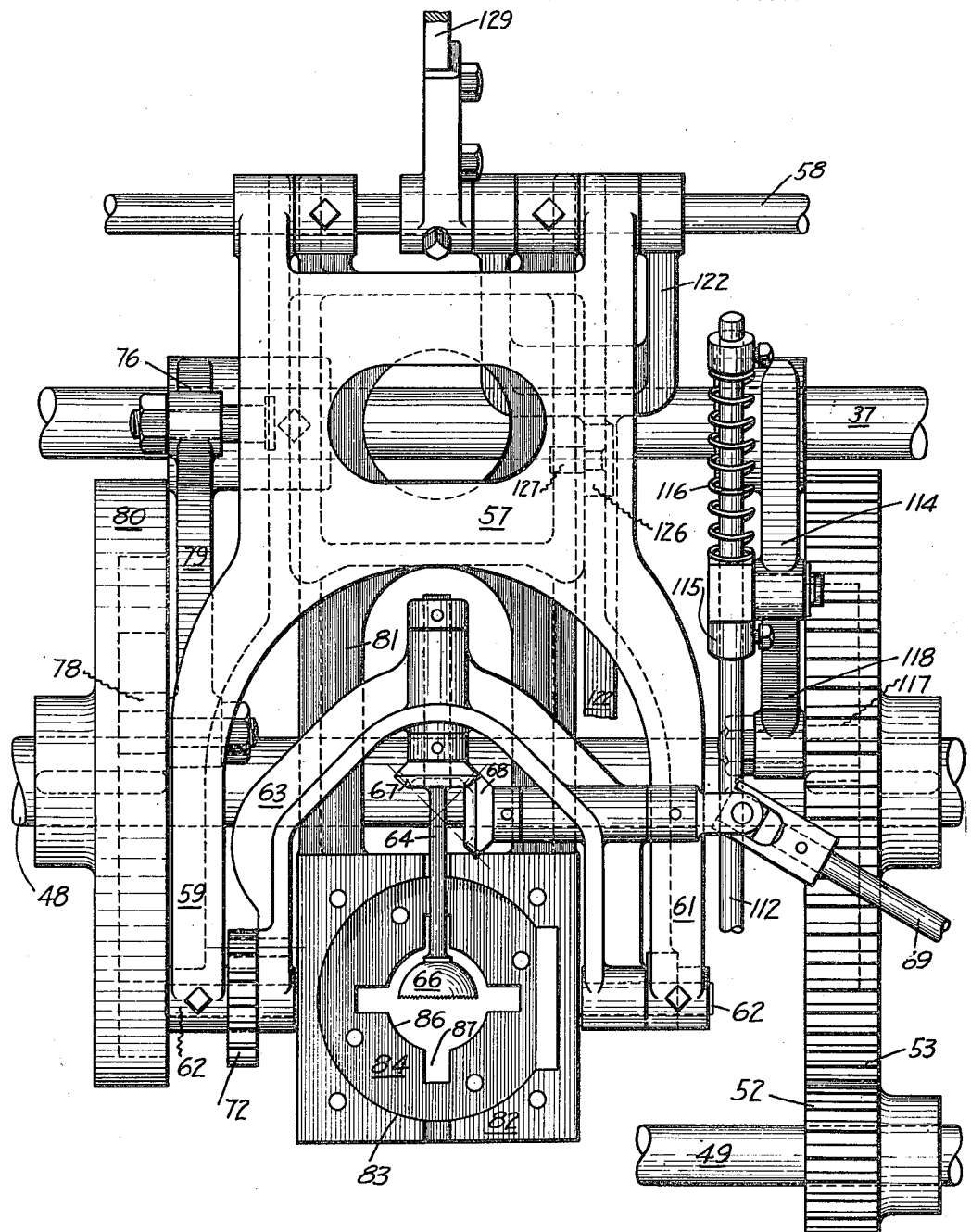

Oct. 21, 1924.
J. J. ELDRIDGE
1,512,410
FRUIT PITTING MACHINE
Filed Jan. 20, 1923     5 Sheets-Sheet 1
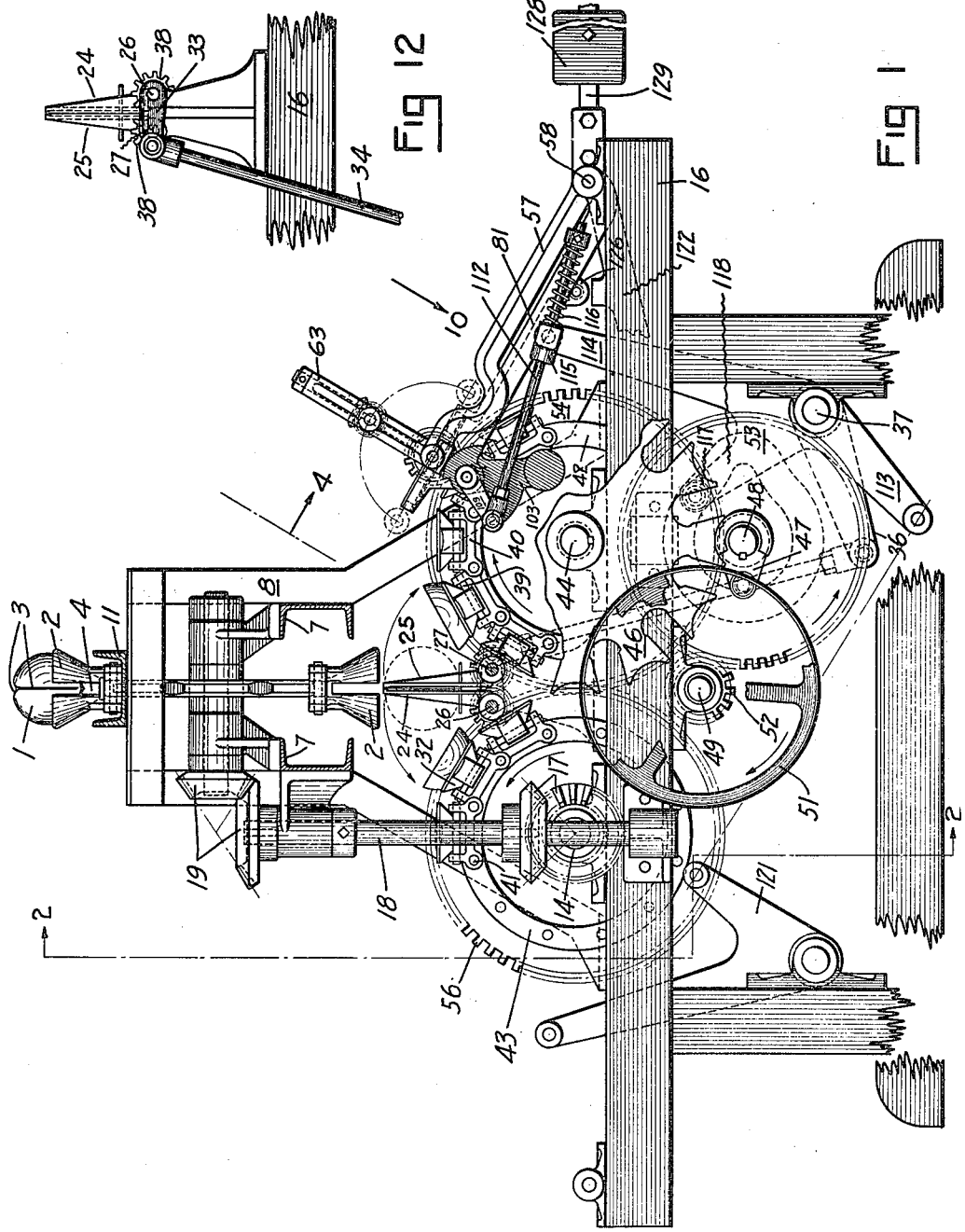
WITNESS
R. B. Dygert
INVENTOR.
JOHN J. ELDRIDGE.
BY White Prost r Evans
ATTORNEYS.

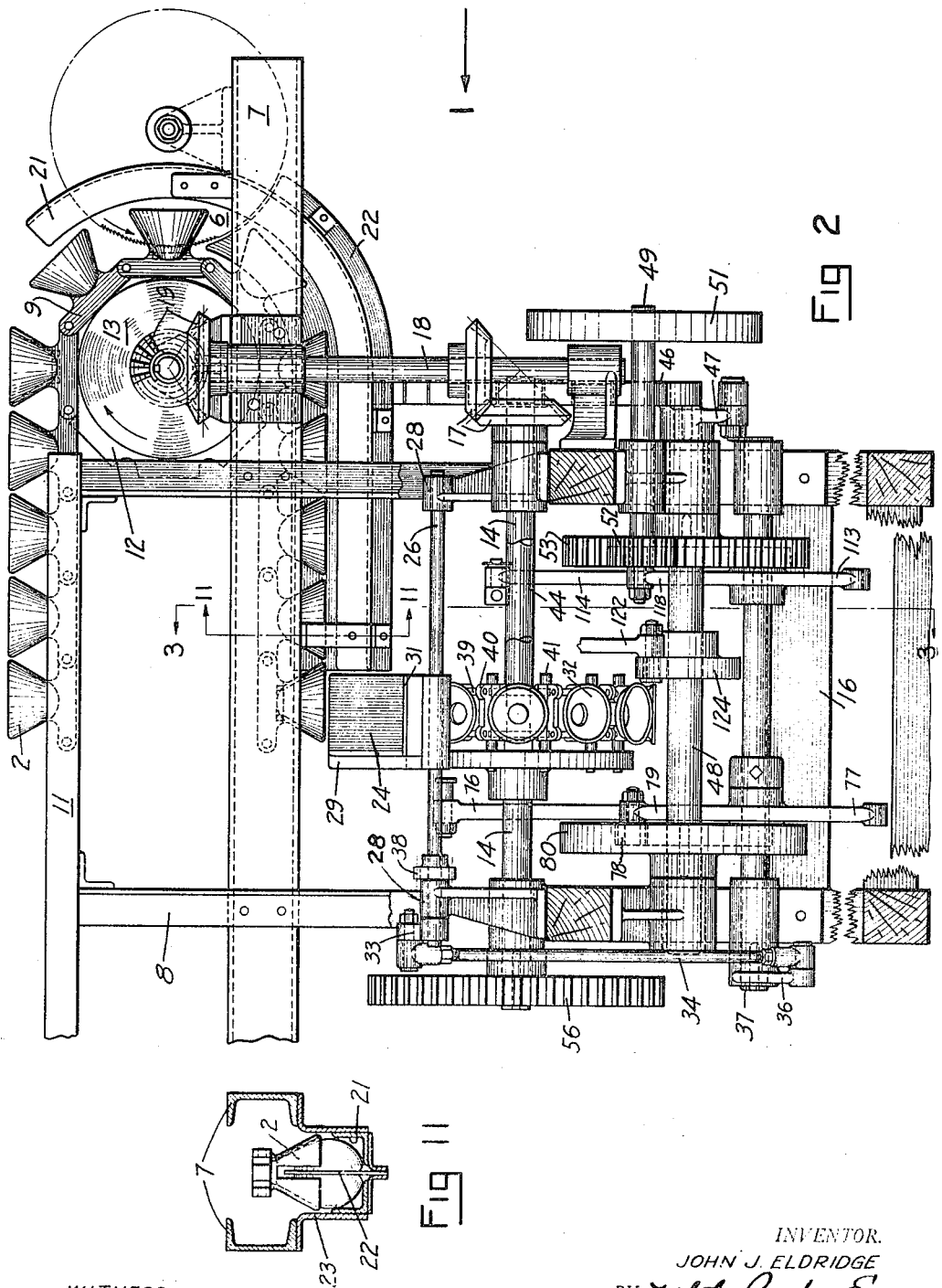

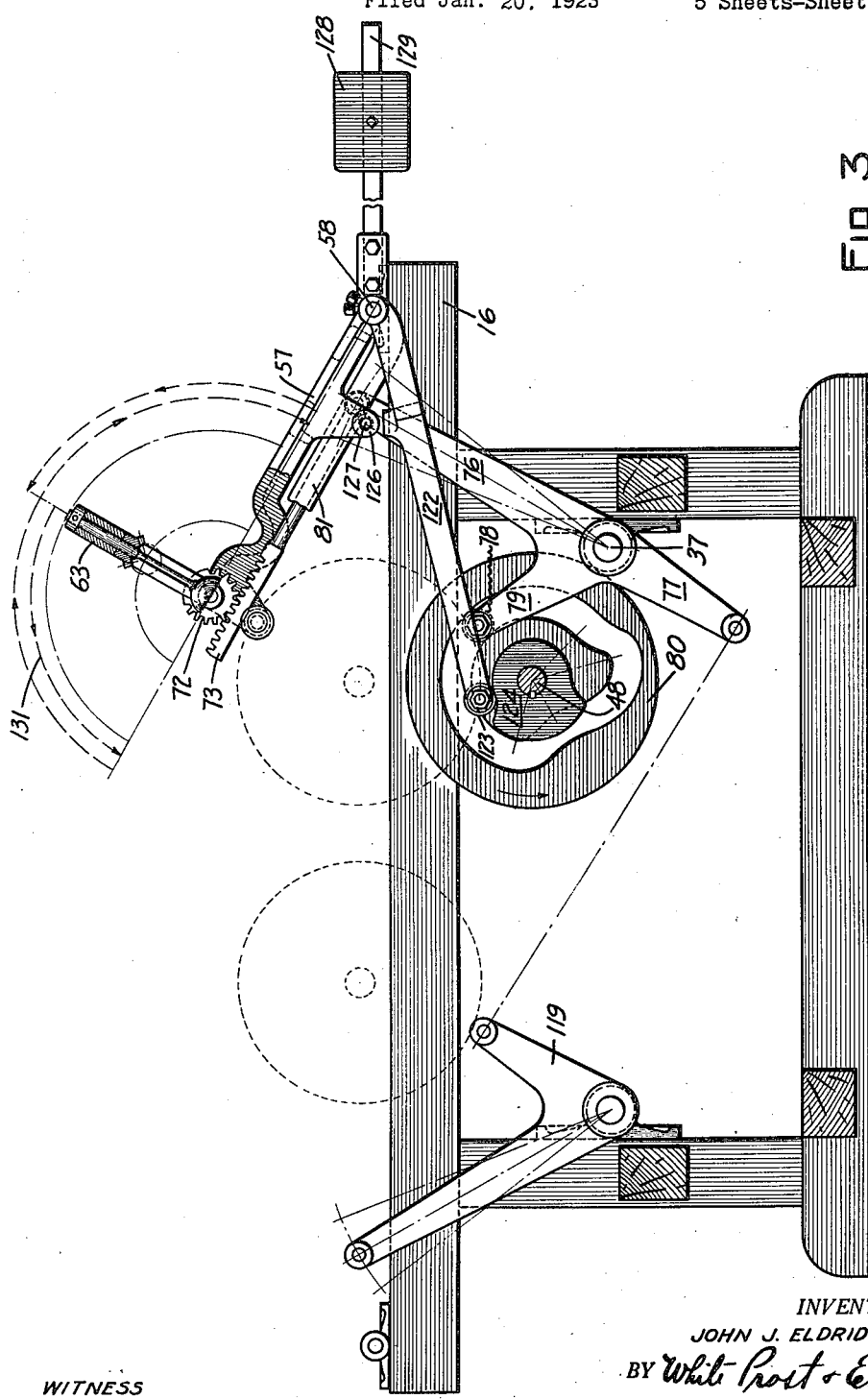

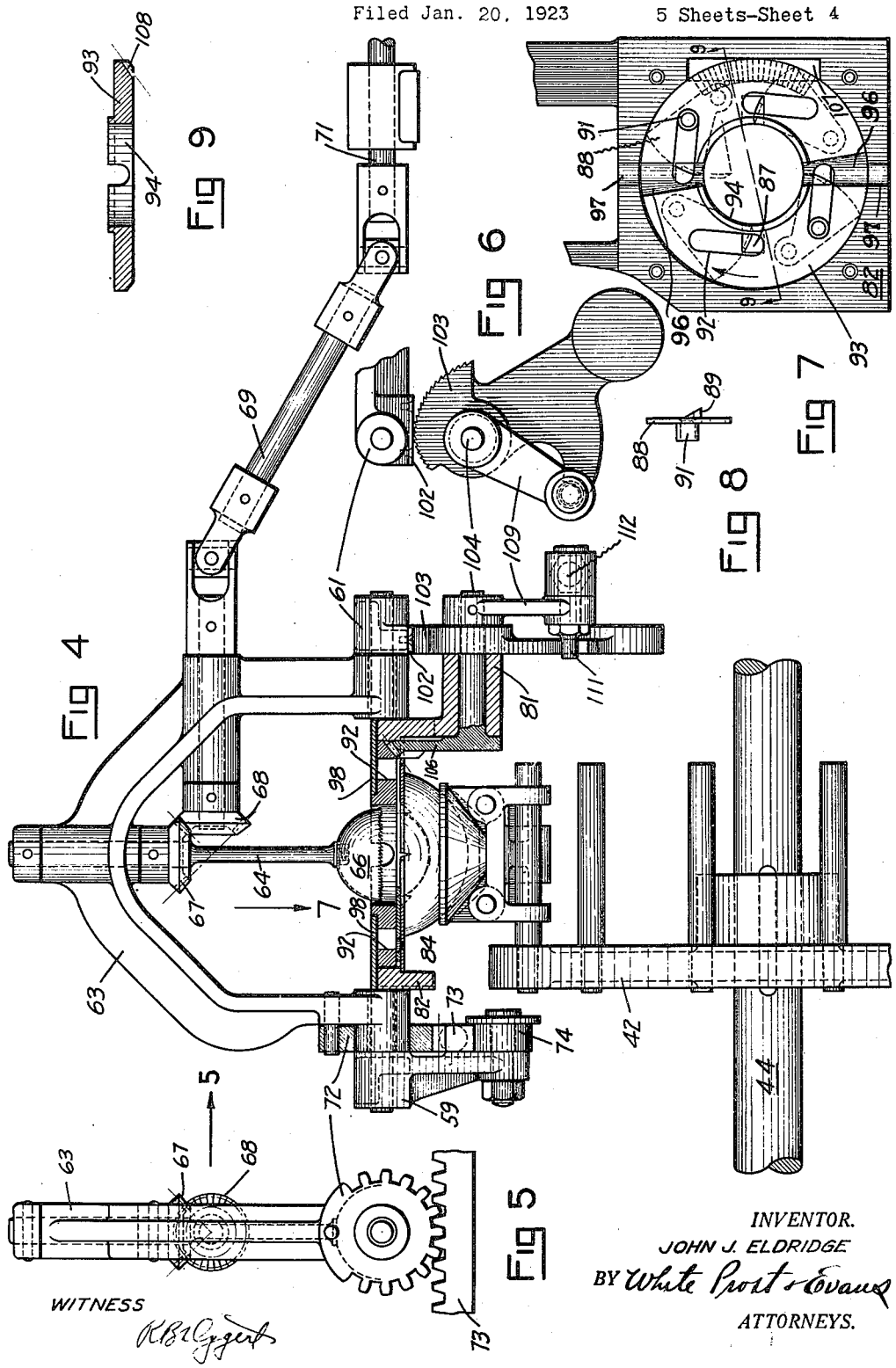

Oct. 21, 1924.　　　　　　　　　　　　　　　　1,512,410
J. J. ELDRIDGE
FRUIT PITTING MACHINE
Filed Jan. 20, 1923　　　5 Sheets-Sheet 5

WITNESS

INVENTOR.
JOHN J. ELDRIDGE
BY White Prost & Evans
ATTORNEYS.

Patented Oct. 21, 1924.

1,512,410

UNITED STATES PATENT OFFICE.

JOHN J. ELDRIDGE, OF OAKLAND, CALIFORNIA, ASSIGNOR OF ONE-HALF TO ALBINO S. DONDERO, OF OAKLAND, CALIFORNIA.

FRUIT-PITTING MACHINE.

Application filed January 20, 1923. Serial No. 613,831.

*To all whom it may concern:*

Be it known that I, JOHN J. ELDRIDGE, a citizen of the United States of America, and a resident of Oakland, county of Alameda, and State of California, have invented a new and useful Fruit-Pitting Machine, of which the following is a specification.

My invention relates to devices for pitting fruit and particularly to a machine for pitting peaches.

One of the important steps in the preparation of peaches for canning is the removal of the pit. In most canneries, at present, this is done by hand with a pitting knife having a spoon-shaped blade. This method, even with the most efficient of operators, is slow and wasteful.

One of the objects of my invention is to provide an automatic machine for removing the pits from peaches.

Another object of the invention is to provide a fruit pitting machine of the class described in which the fruit is divided into halves and the half pit removed from each part.

Another object of the invention is to provide a fruit pitting machine of the class described, in which the depth of cut required to remove the pit from each half of the peach, is automatically regulated by the size of the pit.

The invention possesses other features of advantage, some of which, with the foregoing, will be set forth in the following description of my invention. It is to be understood that I do not limit myself to the showing made by the said description, as I may adopt variant forms of my invention within the scope of the claims.

Referring to the drawings: Fig. 1 is a side elevation of the machine, portions being broken away to show more clearly its construction and operation. The direction in which the view is taken is shown by the arrow 1, Fig. 2. Fig. 2 is a vertical section thru the main frame taken on the line 2—2 of Fig. 1. Fig. 3 is a vertical section thru the main frame taken on the line 3—3 of Fig. 2, showing the grooved cam device operating the pitting mechanism. Fig. 4 is an elevation of the pitting mechanism with the pit centering plate and supporting frame shown in section. The direction in which the view is taken is shown by the arrow 4, Fig. 1. Fig. 5 is a side elevation of the pitting saw frame showing a part of the rack adapted for engagement with the fixed pinion on the frame. The direction in which the view is taken is shown by the arrow 5, Fig. 4. Fig. 6 is an elevation taken on the opposite side of the pitting saw frame, from Fig. 5, showing the cam for regulating the height of the pitting saw. Fig. 7 is a plan view of the pit centering plate and supporting frame. The direction in which the view is taken is shown by the arrow 7 in Fig. 4. Fig. 8 is an elevation of one of the pit centering knife plates. Fig. 9 is a vertical section thru the pit centering plate taken on the line 9—9 of Fig. 7. Fig. 10 is a plan view of the pitting device showing the grooved cam control mechanism. The direction in which the view is taken is shown by the arrow 10, Fig. 1. Fig. 11 is a vertical section thru the conveyor frame taken on the line 11—11 of Fig. 2, showing the separating plate which passes between the halved peaches. Fig. 12 is an elevation of the separating blades taken from the side of the machine opposite to that shown in Fig. 1.

Broadly stated, my invention comprises means for conveying the pieces of fruit to be pitted to means for cutting the pieces into halves; means for conveying each half of the fruit to an operating station under the pitting means; means for centering the half-fruit by the pit; and means for removing the pit, the depth of cut taken by the pitting blade being automatically adjusted by the size of the pit.

The pieces 1 of whole fruit, which for purposes of explanation will be assumed to be peaches, are placed by hand in the cups 2, with the natural groove or depression 3 in the surface of the peach, in the center of the slots 4. These slots are adapted to clear a circular saw 6, journaled on the channels 7, forming part of the superstructure 8. The groove 3 is the natural line of cleavage in the fruit, and as each peach comes in contact with the saw, it is cut symmetrically into two parts. The cups 2 are rigidly attached to the links 9, forming an endless conveyor slidable in the channel 11, which forms the uppermost member of the superstructure 8. The links 9 engage the teeth 12 of a sprocket 13, journaled on the channels 7. The sprocket is driven from the shaft 14, journaled in the main frame 16, by the spur gears 17, the vertical shaft 18, and the spur gears 19. As the cups on the conveyor leave the saw, the peaches contained therein are held in place by the angles 21, which form a guide structure. Below and adjacent the periphery of the saw, this guide structure is supplemented by a web 22, fixed thereto, and lying in the same plane as the saw. The whole structure is supported from the channels 7 by the angles 23, Fig. 11. As each peach is cut by the saw, the halves are separated by the web 22, as the fruit is conveyed to the separator blades 24 and 25. These blades are rigidly fixed to the shafts 26 and 27 mounted in the bearings 28 supported on the main frame 16, and when in contact with each other, are a continuation of the web 22 of the guide structure. The position of the peach halves on the blades is fixed by the vertical shoulder 29 and the horizontal shoulder 31 on each blade. Means are provided for swinging the separator blades apart, as indicated by the arrows in Fig. 1, to deposit the halves of fruit in the cups 32. A crank arm 33, fixed on the shaft 26, is connected by the link 34 with the lever arm 36 fixed on the shaft 37. Gears 38 connect the shafts 26 and 27 so that movement of the crank arm 33 results in swinging both blades simultaneously.

The cups 32 are slidably mounted, in the direction of rotation, on the rods 39 of the links 40, which, in turn, are slidably mounted on rods 41 rigidly attached to and extending from the rim of the conveyor wheels 42 and 43 in parallelism with their axes. This double adjustment of the cups permits their movement with the half fruit therein, when the latter is centered in the operating station prior to the pitting operation. The wheel 42 is fixed to a shaft 44 suitably journaled in the main frame 16, Fig. 2, and is given a step-by-step rotary movement by the Geneva gear 46 fixed to the shaft 44, and actuated by a crank 47, secured to a shaft 48, journaled in the main frame 16. On a shaft 49 journaled in the main frame is fixed a pulley 51, driven by a belt from any suitable power source. A gear 52, fixed to the power shaft 49, meshes with the toothed rim of a grooved cam 53, fixed to shaft 48. The wheel 43 is adapted for simultaneous rotation, opposite to that of wheel 42, by the gears 54 and 56 rigidly fixed to the shafts 44 and 14, respectively, Figs. 1 and 2.

Partially overlying the conveyor wheel 42 at the operating station and centered over the cups 32 mounted on the wheel, is a pitting mechanism which comprises a Y-form frame 57 journaled at one end, on the shaft 58, arranged on the frame 16, and provided at the end of each of the arms 59 and 61 of the Y, with the fixed pins 62. Journaled on the pins 62 is a pitting saw frame 63, Fig. 4, in which is journaled one end of a shaft 64. Rigidly fixed on the opposite end of the shaft is a spherical blade 66, preferably though not necessarily comprising one-half of a complete sphere and having saw teeth formed in the edge thereof. The blade is rotated about its symmetrical axis, that is the axis perpendicular to the plane of the edge, by a bevel gear 67 fixed to the shaft 64, and a companion gear 68 journaled in the frame 63. The bevel gear 68 is flexibly connected by suitable means 69 to a shaft 71 which is driven from any desired source of power.

Rigidly fixed to one of the bearing ends of the pitting saw frame is a pinion 72, engaging a rack 73. The rack is held in engagement with the pinion by a pin mounted roller 74 on the end of the arm 59 of the frame 57. One end of the rack 73 is adapted for connection to an arm 76 of a lever 77 suitably journaled in the main frame 16. A pin mounted roller 78 on the end of the arm 79 of the lever, is adapted for engagement with a grooved cam 80 fixed to the shaft 48. The oscillatory motion of the lever produced by the rotation of the cam 80 imparts a reciprocating motion to the rack 73, which thru the pinion 72, swings the pitting saw frame thru an arc of 180°. From the above it will be clear that the pitting blade is given two rotary motions, one rotation about an axis perpendicular to the plane of the base of the hemisphere at its center, and the other oscillation about an axis perpendicular to the first and intersecting the said center. The relation of parts is such that while the rotation is continuous, the oscillatory movement is first in one direction thru an arc of 90°, then back thru 180°, then forward again thru 90° to first position.

Means are provided adapted to engage the pit for positioning the fruit relative to the pitting blade.

Partially underlying the frame 57 and extending inside the pitting saw frame 63 is a pit centering frame 81, Fig. 10, preferably rigidly fixed at one end to the shaft 58. Integrally formed on the opposite end is a centering plate holder 82, preferably square in form and having a circular aperture 83 symmetrically disposed therein. Suitably secured to the under side of the centering plate holder is a base plate 84, with a circular aperture 86, concentric with the aperture 83 and having notches 87, preferably rectangular in form, disposed along perpendicular median lines of the plate.

Pivotally mounted at regular intervals on the base plate 84 and adapted to swing thru small arcs are a plurality of plates 88, Figs. 7 and 8. A portion of each plate is turned down to form a jaw 89 having sharp edges to facilitate entrance into and movement thru the flesh of the fruit. The jaws extend thru the base plate in each of the notches 87 therein. Vertically fixed on each plate is a pin mounted roller 91 engaged in slots 92 disposed in a circular centering plate 93 mounted in the centering plate holder 82. The slots are disposed so that the oscillation of the centering plate, causes the jaws to converge and recede. A circular aperture 94 symmetrically disposed in the centering plate 93 is coincident with the aperture 86 in the base plate and allows the passage of the saw 66 therethru. Coincident grooves 96 and 97 in the centering plate 93 and holder 82 insure their clearing the pitting saw shaft 64, when the pitting saw frame reaches the limits of its swing. Extending over the top of the centering plate 93 and the centering plate holder 82, is a cover plate 98 which with the base plate 84 encloses the pit centering mechanism.

Adapted to be fixed to the end of the arm 61 of the frame 57 is a plate 102, the underside of which is grooved for contact with the toothed surface of a counterbalanced arm 103 adapted to swing freely on a shaft 104. The shaft 104 is journaled in the pit centering frame 81, and a gear segment 106 integrally formed on one end thereof and passing thru a slot 107, Figure 7, in the pit centering mechanism, is adapted for engagement with gear teeth 108 formed on the underside of the centering plate 93. Rigidly fixed to the opposite end of the shaft 104 is an arm 109; and a pin 111 rigidly fixed therein, is adapted at one end to engage the counterbalance of the cam 103, and at the opposite end is journaled to the connecting rod 112. Rigidly fixed to the shaft 37 is a lever 113, one arm 114 of which is slidably mounted on the connecting rod 112, being limited in its movement thereon by the fixed stop 115 on one side and the coil spring 116 on the other. A pin mounted roller 117, on the end of the arm 118 of the lever, is adapted for engagement with the grooved cam 53, which, when rotated, imparts an oscillatory motion to the lever. As the lever is rigidly fixed to the shaft 37, the shaft is given the necessary oscillatory motion to operate the separator blades 24 and 25.

A similar pitting mechanism is adapted to be mounted on the left side of the main frame 16 as viewed in Fig. 1, to handle the fruit on the wheel 43, but this is a mere duplicate of that just explained and for simplicity is omitted from the drawings. Motion is imparted to this pitting mechanism by levers 119 and 121 corresponding respectively to levers 77 and 113, and adapted to be suitably connected therewith.

As the Geneva gear 46, which imparts the proper timing to the moving parts of the machine, rotates the wheel 42 to bring the peach into position to be pitted, the pitting mechanism is lifted to allow the peach to pass under it. This is accomplished by a lever 122, Fig.3, one end of which is journaled on the shaft 58, and the opposite end of which is adapted to receive a roller 123 engaging a cam 124, fixed to the shaft 48. Rotation of the cam causes the lever to oscillate, and when rising, it lifts the frame 57, by contact with a boss 126 integrally formed thereon. The frame 57 is raised slightly in advance of the rest of the pitting mechanism to permit the counterbalanced cam 103 to assume its normal position. A further lifting of the frame 57, engages the pin 127, fixed in the boss 126, with the pit centering frame 81, thus raising it sufficient to permit the incoming peach to clear the centering jaws 89. As the fruit reaches its operating station under the centering plate 93, the cam 124 allows the centering frame 81 to drop, by its own weight, to its normal position, in contact with the fruit, the jaws 89 in the centering plate entering the fruit adjacent the pit. The frame 81 is partially counterbalanced by an adjustable weight 128, mounted on an arm 129 rigidly fixed to the shaft 58, allowing the frame to fall without injury to the fruit. After the frame 81 has dropped, the cam 53, swings the lever 113, moving the rod 112, by tendency to compress the spring 116, and thus effecting a swinging of the arm 109. The movement of the arm 109 causes the gear segment 106 to rotate the centering plate 93, which, in turn, causes the jaws 89 to converge until they engage the peach pit, moving it and its holding cup to the desired operating position. If the throw of the lever 113 is greater than needed to lodge the jaws firmly and with continuous pressure against the pit, its continued movemen is absorbed without harm by the spring 116.

The movement of the arm 109 also causes a movement of the counterbalanced cam 103, to raise the pitting saw, and this upward movement of the saw is therefore coextensive with the converging movement of the jaws. As cessation of this movement is caused by the contact of the jaws with the pit, the depth of the cut is always proportioned to the size of the pit. Rotation of the cam 53 from its point of maximum throw imparts a reverse movement to the centering plate 93, causing the jaws 89 to recede to their normal position, leaving the aperture 94, in the centering plate, clear to permit the pitting saw 66 to pass. Simultaneously with the recession of the jaws the cam 80 causes the lever 77 to oscillate, thus imparting a reciprocating motion to the rack 73, causing the pitting saw frame 63 to swing, as shown in Fig. 3, from its normal position, thru an arc 131, of 90°, then backwardly thru an arc of 180° and forwardly to normal position once more. This movement of the pitting saw, combined with a continuous axial rotation, completely separates the pit from the fruit. As this operation is completed, the Geneva gear 46 moves the conveyor, and the wheels 42 and 43, a step further, and the pitting operation is repeated on the next succeeding piece of fruit. The pitted fruit, on falling from the wheels 42 and 43, may be conveyed away from the machine in any suitable manner.

I claim:

1. In a fruit pitting machine, a substantially hemispherical blade, means for rotating the blade about an axis perpendicular to the base of the hemisphere at its center, and means for oscillating said blade about an axis intersecting said center and perpendicular to said first named axis.

2. In a fruit pitting machine, means for dividing the fruit into halves, a substantially hemispherical blade, means for rotating the blade about an axis perpendicular to the base of the hemisphere at its center, and means for oscillating said blade into each half on each side of the pit to separate the pit.

3. In a fruit pitting machine, means for dividing the fruit into halves, a substantially hemispherical blade, means for rotating the blade about an axis perpendicular to the base of the hemisphere at its center, means for positioning a half with its severed surface lying adjacent to the plane of the base of the hemisphere, and means for oscillating said blade into said half thru an arc of substantially 90° on opposite sides of the pit.

4. In a fruit pitting machine, means for dividing the fruit into halves, a substantially hemispherical blade, means for rotating the blade about an axis perpendicular to the base of the hemisphere at its center, means acting upon the pit of a half for positioning the half, and means for oscillating said blade into said half on opposite sides of the pit.

5. In a fruit pitting machine, means for dividing the fruit into halves, a substantially hemispherical blade, means for rotating the blade about an axis perpendicular to the base of the hemisphere at its center, means acting upon the pit of a half for laterally positioning the half, means for positioning the half with its severed surface lying adjacent to the plane of the base of the hemisphere, and means for oscillating said blade into said half on opposite sides of the pit.

6. In a fruit pitting machine, a spherical pitting blade, means for imparting to said blade a rotary motion to sever the pit from the fruit, and means acting in conjunction with the pit for positioning said fruit adjacent said blade.

7. In a fruit pitting machine, means for cutting the fruit into halves, a spherical pitting blade, means for presenting a half to said blade, and means for rotating said blade into said half to sever the pit therefrom.

8. In a fruit pitting machine, a spherical pitting blade, a pivoted frame on which said blade is mounted, means for presenting at an operating station adjacent said blade halves of fruit to be pitted, means for raising said frame as the fruit moves to the operating station, and then lowering said frame, means on said frame for engaging the pit to center the fruit relative to the pitting blade, and means for rotating said blade into said fruit to sever the pit therefrom.

9. In a fruit pitting machine, a saw for cutting the pieces of whole fruit into halves, and cups for holding the fruit while being cut and provided with slots thru which the saw runs during the cutting.

10. In a fruit pitting machine, a conveyor for holding pieces of whole fruit, means for cutting each piece with its pit into halves, means for transferring a half to a second conveyor, means for severing the half-pit from the half-fruit, and means for positioning the half-fruit on the second conveyor acting in conjunction with the half-pit.

11. In a fruit pitting machine, means for cuitting the fruit into halves, means for presenting said halves at an operating station, means at said station for severing the pits, and means operating automatically in accordance with the size of the pits for adjusting the depth of cut of the severing means.

12. In a fruit pitting machine, means for cutting the fruit into halves, a spherical pitting blade, means for presenting a half to said blade, means for rotating said blade into said half to sever the pit therefrom, and means operating automatically in accordance with the size of the pit for adjusting the depth of cut of the severing means.

13. In a fruit pitting machine, means for cutting the fruit into halves, a spherical pitting blade, means for presenting a half to said blade, means for rotating said blade into said half to sever the pit therefrom, and means engaging the pit for centering it relative to the severing means and for automatically adjusting the cut of the severing means to the size of the pit.

14. In a fruit pitting machine, a pitting blade, a cup mounted for lateral movement in two directions and for holding the fruit, and means engaging the pit for moving the cup to position the fruit relative to the pitting blade.

15. In a fruit-pitting machine, a pitting blade, a cup mounted for lateral movement in two directions and for holding the fruit, means engaging the pit for moving the cup to position the fruit relative to the pitting blade, and means controlled by said pit engaging means for moving the pitting blade relative to the pit to adjust the depth of its cut.

16. In a fruit pitting machine, a pair of wheels, a cup on each wheel for conveying a piece of fruit to be pitted to an operating station, means at each operating station for pitting the fruit, means for cutting the pieces of whole fruit into halves, and movable means for separating the halves and for depositing the halves in said cups.

17. In a fruit pitting machine, a saw for halving the fruit, a pair of conveyors, a pair of separator blades alined with said saw, means for conveying the halved fruit from the saw to the separator blades so that the blades are interposed between the halves of fruit, and means for oscillating said separator blades to deposit one of said halves on each of said conveyors.

18. In a fruit pitting machine, a pitting blade, means for presenting pieces of halved fruit adjacent said pitting blade, and a chuck comprising dogs engageable with the pit for positioning the fruit relative to the pitting blade.

19. In a fruit pitting machine, a dividing mechanism, means for conveying fruit to said dividing mechanism, pitting mechanisms including means for centering each divided portion and means for separating the pit therefrom, and means for conveying each divided portion from the dividing mechanism to said pitting mechanisms.

20. In a fruit pitting machine, a dividing mechanism, means for conveying fruit to said dividing mechanism, pitting mechanisms including means engaging the pit for centering each divided portion and means for separating the pit therefrom, and means for conveying each divided portion from the dividing mechanism to said pitting mechanisms.

21. In a fruit pitting machine, a dividing mechanism, means for conveying fruit to said dividing mechanism, pitting mechanisms including means for centering each divided portion means for separating the pit therefrom and means for adjusting the depth of cut taken by the separating means, and means for conveying each divided portion from the dividing mechanism to said pitting mechanism.

In testimony whereof, I have hereunto set my hand.

JOHN J. ELDRIDGE.